(12) United States Patent
Ogawa

(10) Patent No.: US 6,467,655 B1
(45) Date of Patent: Oct. 22, 2002

(54) PUMP DISPENSER

(75) Inventor: Kenji Ogawa, Musashino (JP)

(73) Assignee: Neuberg Company Limited, Tokyo (JP)

(*) Notice: Subject to any disclaimer, the term of this patent is extended or adjusted under 35 U.S.C. 154(b) by 0 days.

(21) Appl. No.: 09/994,766

(22) Filed: Nov. 28, 2001

(51) Int. Cl.[7] .............................................. G01F 11/00
(52) U.S. Cl. ..................................... 222/309; 222/504
(58) Field of Search ................................. 222/287, 305, 222/309, 504, 518

(56) References Cited

U.S. PATENT DOCUMENTS

| | | | | |
|---|---|---|---|---|
| 4,890,535 A | * | 1/1990 | Bieber ........................ 141/167 |
| 5,050,781 A | * | 9/1991 | Cloup ......................... 222/305 |
| 6,085,943 A | * | 7/2000 | Cavallaro et al. ........... 222/309 |

FOREIGN PATENT DOCUMENTS

| | | |
|---|---|---|
| JP | 02-055878 | 2/1990 |
| JP | 02-230975 | 9/1990 |
| JP | 09-324743 | 12/1997 |

* cited by examiner

Primary Examiner—Joseph A. Kaufman
(74) Attorney, Agent, or Firm—Lowe Hauptman Gilman & Berner, LLP

(57) ABSTRACT

A pump dispenser includes: a valve block having a first slide contact surface, a discharge opening and a suction opening; a pump block having a second slide contact surface and a plunger insert hole; a plunger slidably inserted to the plunger insert hole; a pump-driving shaft for rotating the pump block to advance and retract the plunger; and a motor for controllably rotating the pump-driving shaft per one rotation, the pump-driving shaft being attached with a roller, the pump dispenser further having a guide member capable of adjusting inclination angle thereof relative to a reference surface orthogonal with an axis of the pump-driving shaft, the guide member guiding the roller moving in accordance with a rotation of the pump-driving shaft to advance and retract the pump-driving shaft.

4 Claims, 14 Drawing Sheets

PUMP DISPENSER

BACKGROUND OF THE INVENTION

1. Field of the Invention

The present invention relates to a pump dispenser for sucking and discharging liquid by virtue of reciprocal movement of a plunger.

2. Description of Related Art

Conventionally, a liquid dispenser (liquid discharging device) mainly has an arrangement where liquid packed in a syringe is pressurized for a short time and pushed by air or a valve is opened for a short time after pressurizing the liquid.

However, since discharge accuracy is not so high and minute discharge control is difficult according to such arrangement, a pump dispenser has come to be used in response to such demand.

An easily-controllable pump dispenser such as gear pump in proportion to rotation, a viscosity pump, a screw pump and a positive-load pump using an automatic valve is used as the above pump dispenser. Though the dispensers have higher accuracy than dispensers other than pump-type, further improvement in accuracy and minute discharge required for very small amount discharge dispenser used for medicine analyzer etc. and a dispenser for discharging adhesive for bonding IC chips in semiconductor manufacture line has been difficult.

A forced valve plunger pump dispenser capable of achieving high accuracy, though control thereof becomes slightly difficult, has been used for the area requiring high accuracy and minute discharge control. The following dispensers are such dispensers.

(1) D-Cut Plunger Pump

This pump is a combination of a plunger barrel with a distal end thereof being shut and having suction and discharge ports on both sides thereof and a D-cut plunger pump for rotatably switching a valve, which is simple and excellent except for disadvantages where minute leakage and inevitable residence portion are generated and very small amount of discharge in the range from micro to nano-liters is difficult.

(2) Rotary Valve Plunger Pump

This pump is a combination of independently provided planar valve, cylindrical valve and plunger. Since the valve and the plunger are independently provided, residence portion is increased.

(3) Cylindrical Plunger Pump

As shown in Japanese Patent Laid-Open Publication No. Hei 2-55878 and Japanese Patent Laid-Open Publication No. Hei 2-230975 filed by the Applicant of the present application, this pump has an integrated concentric disposition of a planar valve, a cylindrical valve and a plunger, whereby the residence portion is extremely reduced and accuracy is substantially improved as compared to the above (1) and (2) pumps. However, since sealing structure becomes so complicated that it is difficult to avoid in-liquid pump structure.

(4) Planar Valve Plunger Pump

Though the discharge accuracy can be greatly improved in the above (3) arrangement, sealing structure becomes complicated. Accordingly, the Applicant of the present application has developed a planar valve plunger pump dispenser as shown in Japanese Patent Laid-Open Publication No. Hei 9-324743, where the two planar valves and a plunger are integrated to greatly reduce the residence portion to improve accuracy and simplify a sealing structure thereof.

However, according to the planar valve plunger pump dispenser disclosed in Japanese Patent Laid-Open Publication No. Hei 9-324743, velocity (time per one discharge) is difficult to be increased and durability thereof is inferior.

Specifically, the dispenser has a clutch to rotate and stop a pump block to which the plunger is inserted so that the block stops at a position where the hole for the plunger to be inserted corresponds to a suction hole and a discharge hole during suction movement and discharge movement. Accordingly, two rotations and stop movements are required per one cycle of discharge movement, thereby limiting reduction of operation time per one cycle.

Further, in the above dispenser, since a ball screw is used to advance and retract the plunger relative to the pump block, the operation time is difficult to be reduced and, when the operation time is reduced, durability thereof is deteriorated. Specifically, though the ball screw has to be advanced and retracted at a high speed in order to reduce discharge time, it is difficult for a ball screw to conduct such short-distance reciprocal movement at a high speed, and there can be great abrasion, thereby deteriorating durability.

SUMMARY OF THE INVENTION

An object of the present invention is to provide a pump dispenser capable of improving accuracy with less fluctuation of discharge per one time, having excellent durability and capable of high-speed movement.

A pump dispenser according to the present invention includes: a valve block having a first slide contact surface; a pump block having a second slide contact surface adapted to be in contact with the first slide contact surface of the valve block; a plunger inserted to a single plunger insert hole drilled along an axial direction of the pump block, the plunger being slidable in the axial direction; a pump-driving shaft supported by the pump block, the pump-driving shaft being rotatable with the pump block and advanceable toward and retractable from the pump block together with the plunger; a rotary driver for controllably rotating the pump-driving shaft per one rotation unit; and an advancement and retraction driver for advancing and retracting the pump-driving shaft relative to the valve block, in which the valve block has a discharge port for intercommunicating a discharge opening formed on the first slide contact surface with a discharge hole formed on an outside opposite to the first slide contact surface and a suction port for intercommunicating a suction opening formed on the first slide contact surface with a supply hole facing a liquid supply side, in which the plunger insert hole of the pump block is drilled at a position capable of being in communication with the discharge opening and the suction opening of the valve block along an axial direction, and in which the advancement and retraction driver includes a follower attached to the pump-driving shaft and a guide member capable of adjusting inclination angle thereof relative to a reference surface orthogonal with the axial direction of the pump-driving shaft, the guide member guiding the follower moving in accordance with the rotation of the pump-driving shaft to advance and retract the pump-driving shaft.

According to the present invention, since a cam mechanism including the guide member and the follower is used in rotating, advancing and retracting the pump-driving shaft without using a ball screw, high-speed rotation, i.e. high-speed discharge is possible while improving durability.

Further, since only a single plunger insert hole and plunger are provided, the discharge motion is conducted by rotating the pump-driving shaft, i.e. the pump block, for one time, so that the discharge motion of each time can be made identical, thereby improving accuracy of discharge amount of each time.

Further, since the discharge amount can be adjusted by adjusting the inclination angle of the guide member in proportion to the inclination angle, the discharge amount can be more easily adjusted and changed as compared to the arrangement using a cam mechanism, thereby enhancing usability of the dispenser.

An end of the guide member may preferably be supported by a fixed shaft fixed to a case in a pivotable manner, and the pump dispenser may preferably further includes a discharge controller capable of adjusting the inclination angle relative to the reference surface of the guide member by moving the other end of the guide member in the axial direction of the pump-driving shaft.

According to the above arrangement, since the inclination angle of the guide member can be adjusted only by moving the other end of the guide member in the axial direction of the pump-driving shaft by the discharge controller, the discharge amount can be easily adjusted.

The discharge controller may preferably be capable of moving the other end of the guide member from a position on a reference surface at the same level as the fixed shaft to move away from the pump block relative to the fixed shaft.

According to the above arrangement, the condition when follower shaft is close to the fixed shaft, i.e. when the pump-driving shaft (and the plunger) is the most adjacent to the valve block, can be fixed. Accordingly, by setting the plunger tip to be at the level of the end surface of the plunger insert hole of the pump block at the above position, the dead space when the plunger goes the closest toward the valve block can be reduced, thereby preventing residence of the liquid in the plunger insert hole. Further, the adjustment range of the stroke when the guide member is inclined can become the widest, so that the adjustment range of the discharge amount can be enlarged.

The discharge controller may preferably include a micrometer and the other end of the guide member may preferably be moved interlocking with the advancement and retraction of a spindle of the micrometer.

With the micrometer, the discharge amount can be set using the scale of the micrometer, and the setting work can be easily conducted with high accuracy.

DETAILED DESCRIPTION OF PREFERRED EMBODIMENT(S)

An embodiment of the present invention will be described below with reference to attached drawings.

Figure 1:
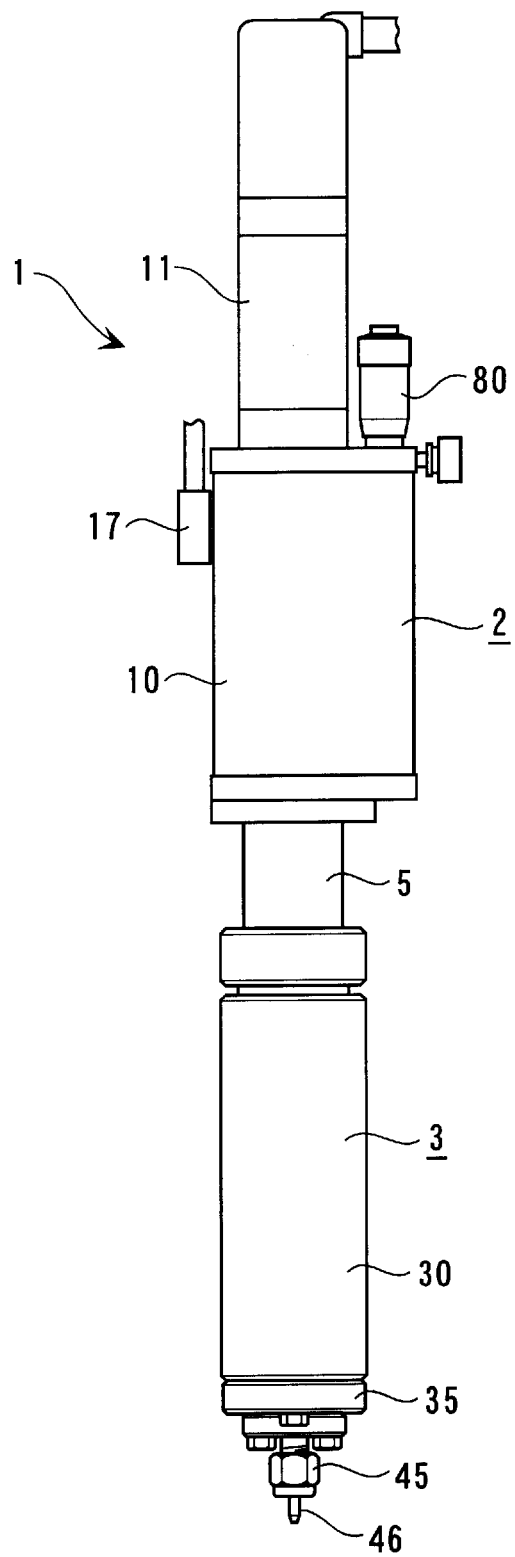
FIG. 1 is a front elevational view showing a dispenser according to an embodiment of the present invention.

FIG. 1 shows a front elevation of a dispenser 1 according to an embodiment of the present invention. The dispenser 1 includes a driving section 2 provided with a driving mechanism and a pump section 3.

Figure 2:
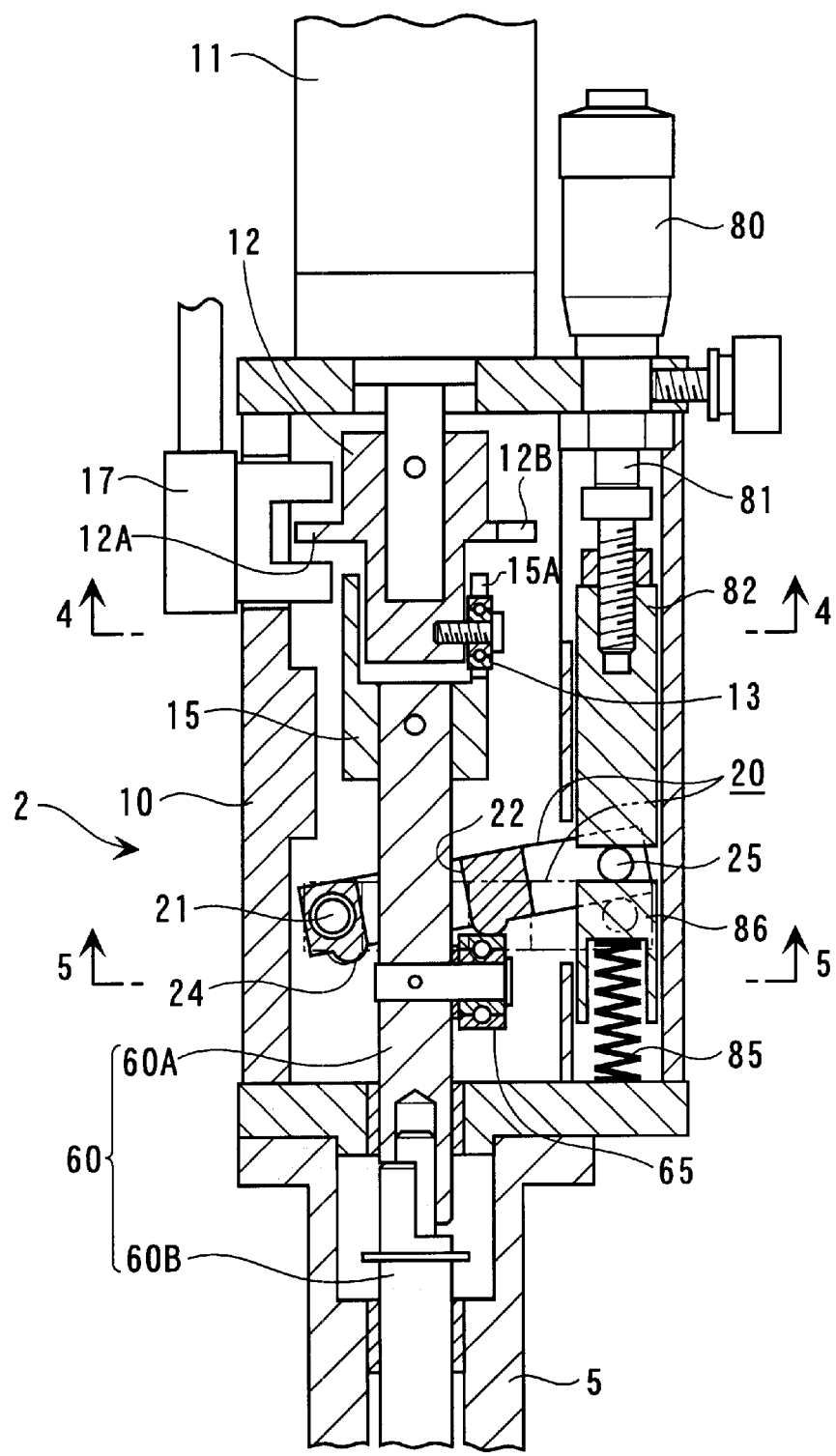
FIG. 2 is a vertical cross section showing a driving section of the aforesaid embodiment.

As shown in FIG. 2, the driving section 2 has a body 10 formed in a box-shape with a plurality of plates and blocks, and a motor 11 fixed to the body 10. A servo-motor and a stepping motor are used for the motor 11, which is capable of controlling per one rotation using a below-described rotary position detecting sensor 17 and a position detecting sensor such as an encoder installed in the servo-motor.

Figure 4:
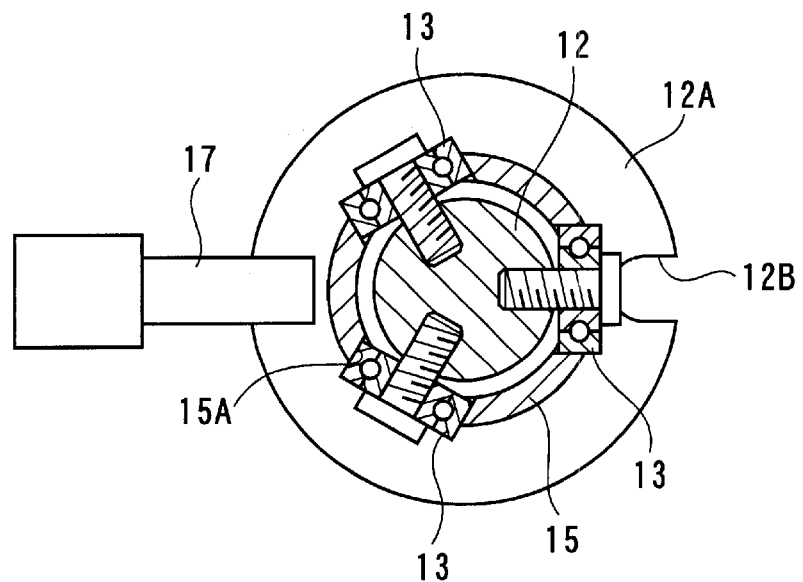
FIG. 4 is a cross section of a primary portion taken along 4—4 line in FIG. 2.

A rotation interlocking member 12 formed in approximate cylinder is fixed to an output shaft of the motor 11. As shown in FIG. 4, a flange 12A provided with a notch 12B at a part thereof is formed on the rotation interlocking member 12. The rotary position detecting sensor 17 is located at the flange 12A portion detects a rotation of the rotation interlocking member 12, i.e. the motor 11, when the notch 12B passes the rotary position detecting sensor 17.

As shown in FIG. 4, three rollers 13 are pivotably supported on the circumference of a lower part (distal part) of the rotation interlocking member 12. The rollers 13 are disposed on the circumference of the rotation interlocking member 12 at a 120 degrees center angle interval.

Figure 3:
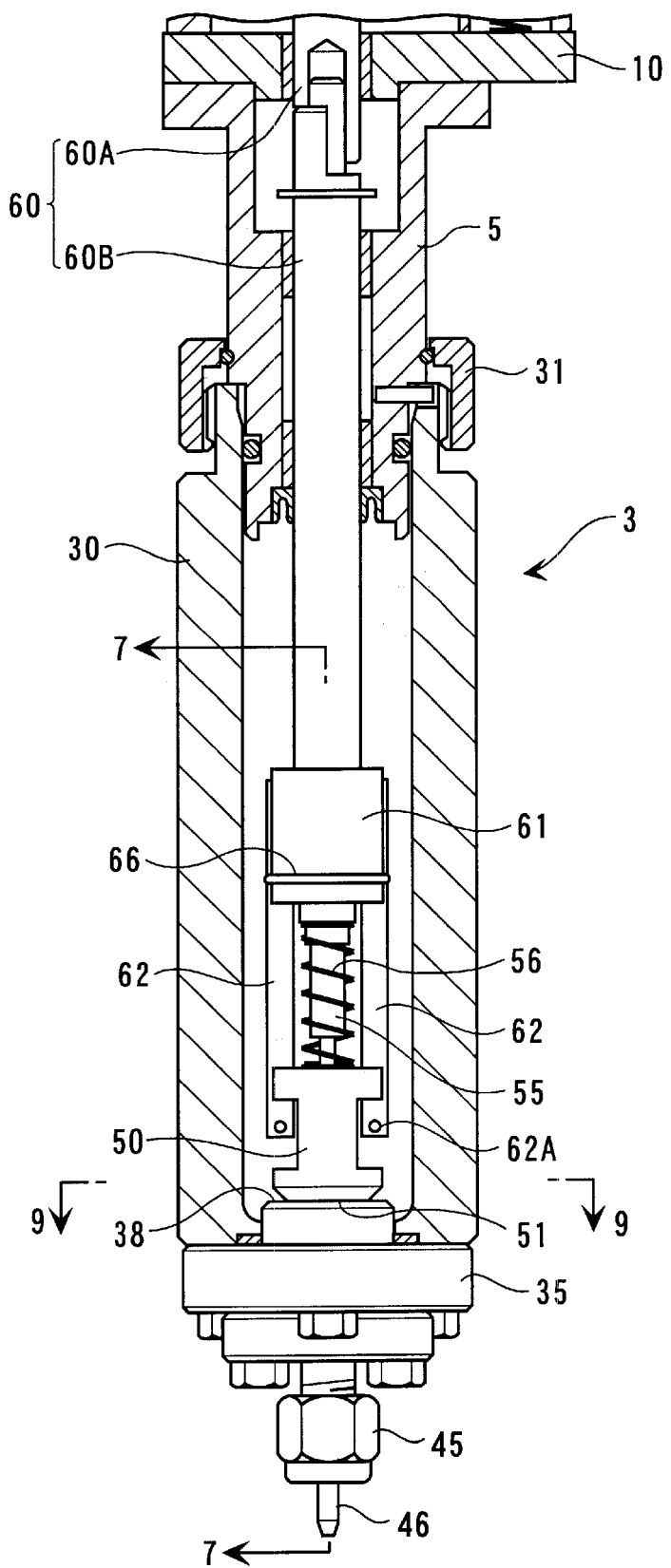
FIG. 3 is a vertical cross section showing a pump section of the aforesaid embodiment.

A pump-driving shaft 60 rotatably supported by the body 10 is disposed on an axis line of the rotation interlocking member 12 and the motor 11. As shown in FIGS. 2 and 3, the pump-driving shaft 60 extends from the driving section 2 to the pump section 3 and is capable of being separated into a drive-side driving shaft 60A located on the driving section 2 and a pump-side driving shaft 60B located on the pump section 3.

Accordingly, when the pump section 3 is detached from the driving section 2 in washing the pump section 3 etc., the pump-side driving shaft 60B can be detached together with the pump section 3.

A rotation transmitting member 15 formed in an approximate cylinder and having three guide grooves 15A for the roller 13 to be guided is fixed on an upper end (motor 11 side) of the drive-side driving shaft 60A.

Since the roller 13 is located in the guide groove 15A of the rotation transmitting member 15, the pump-driving shaft 60 is capable of advancing and retracting (capable of vertical movement) relative to the rotation interlocking member 12, i.e. the motor 11, and is capable of directly transmitting the rotary force of the motor 11, thereby rotating with the rotation interlocking member 12.

Figure 5:
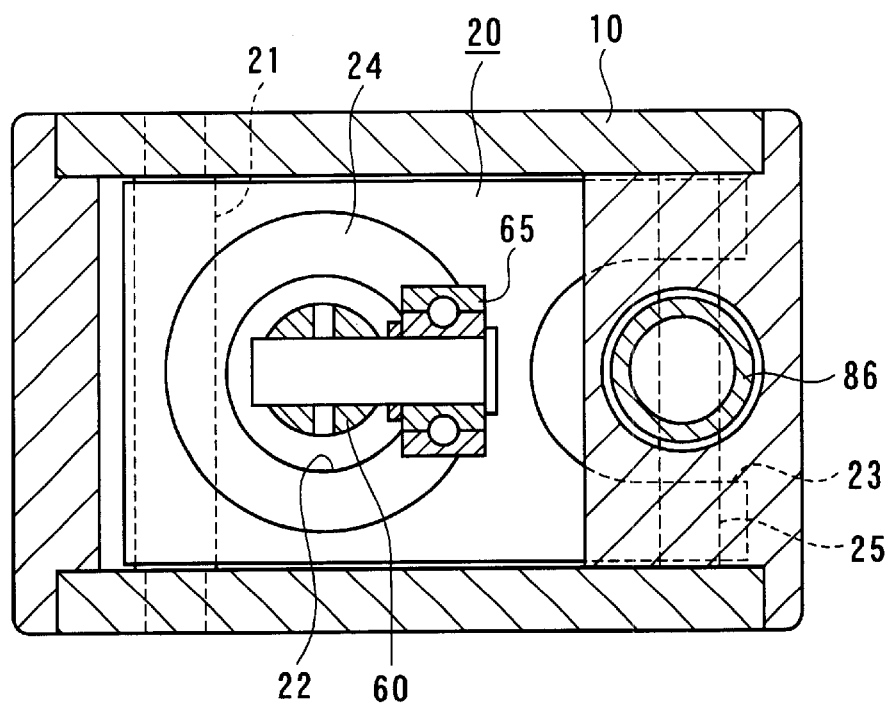
FIG. 5 is a cross section taken along 5—5 line in FIG. 2 when a guide member is horizontally arranged.

As shown in FIG. 5, a fixed shaft 21 adjacent to the drive-side driving shaft 60A and orthogonal with the shaft 60A is attached to the body 10. A guide member 20 formed in an approximate rectangular plate is rotatably supported by the fixed shaft 21.

Figure 6:
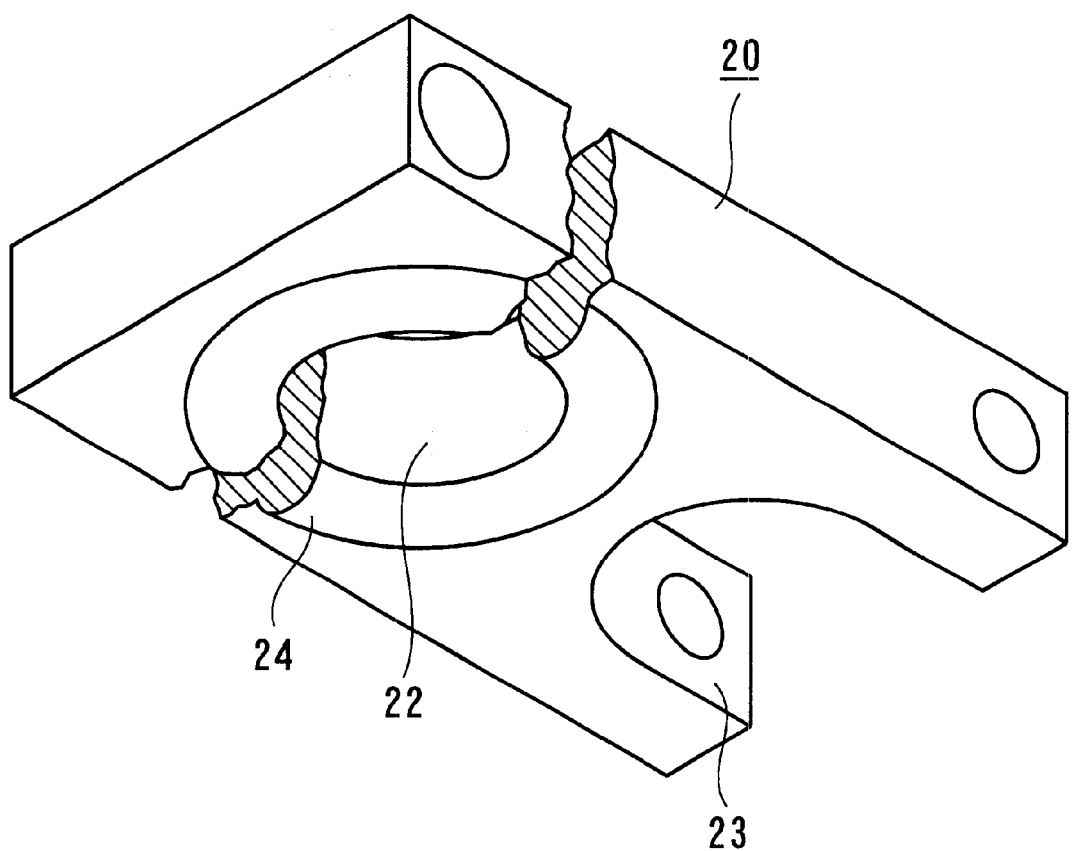
FIG. 6 is a perspective view showing the guide member of the aforesaid embodiment.

As shown in FIG. 6, a through hole 22 adapted for the pump-driving shaft 60 to be fitted and a U-shaped notch 23 are formed on the guide member 20. A roller guide 24 having semicircular cross section and disposed around the through hole 22 in a ring-shape (semicircle) is integrally formed around the through hole 22. A contact shaft 25 parallel to the fixed shaft 21 is attached to the notch 23.

A contact member 82 abuts to an upper side of the contact shaft 25. The contact member 82 is composed of a body being in contact with the contact shaft 25 and a screw being screwed to the body. A spindle 81 of a micrometer 80 fixed to the body 10 abuts to the upper side of the screw.

On the other hand, a biasing member 86 biased upward (toward the motor 11) by a coil spring 85 as a biasing means disposed in the body 10 abuts to a lower side of the contact shaft 25.

Accordingly, the contact shaft 25 is constantly biased upward by the biasing member 86. When a manipulation knob of the micrometer 80 is rotated to advance and retract (vertical movement) the spindle 81 to vertically move the contact member 82, the contact shaft 25 interlocks with the movement thereof, so that the guide member 20 is rotated around the fixed shaft 21 to adjust the inclination angle.

As described above, the micrometer 80, the contact member 82, the coil spring 85 and the biasing member 86 construct the discharge setting means in the present embodiment.

Incidentally, in the present embodiment, when the guide member 20 is horizontally situated if the guide member 20 is orthogonal with the pump-driving shaft 60, in other words, if the pump-driving shaft 60 is disposed along the perpendicular direction, the lower end of the biasing member 86 abuts to the body 10. Accordingly, the guide member 20 is constructed to move from a position where the fixed shaft 21 and the contact shaft 25 are at the same height, i.e. at a horizontal disposition, to a position where the contact shaft 25 is located above the fixed shaft 21, i.e. to a position where the contact shaft 25 is moved upward to incline the guide member 20.

Further, the dimension of the contact member 82 is adjusted so that the scale of the micrometer 80 indicates "0" (reference position) when the guide member 20 is horizontally situated by changing screwing position of the screw of the contact member 82.

A roller 65 as a follower portion fixed to the drive-side driving shaft 60A is abutted to the roller guide 24 of the guide member 20. The roller 65 is in constant contact with the roller guide 24 by the pump-driving shaft 60 being biased upward (toward the motor 11) by a below-described coil spring (biasing means) 56.

Accordingly, when the motor 11 and the pump-driving shaft 60 are rotated, the roller 65 is moved along the roller guide 24. At this time, the pump-driving shaft 60 is not vertically moved when the guide member 20 is in horizontal condition. However, when the guide member 20 is inclined by manipulating the micrometer 80, the roller 65 is vertically moved along the roller guide 24, so that the pump-driving shaft 60 is vertically moved interlocking with the vertical movement while being rotated.

As shown in FIG. 3, the pump section 3 has a case 30 detachably attached to a cylindrical connector 5 screwed to the body 10 of the driving section 2 by a cap nut 31.

Incidentally, the connector 5 rotatably supports the pump-side driving shaft 60B. Further, a seal material is provided at the connecting portion of the connector 5 and the case 30, thereby preventing liquid 7 in the case 30 from leaking out toward the driving section 2 and the outside.

The case 30 is made of stainless steel, fluorocarbon polymer, titanium etc. and is of substantially cylindrical shape.

A stainless-steel valve block 35 is screwed to a lower portion of the case 30.

Figure 7:
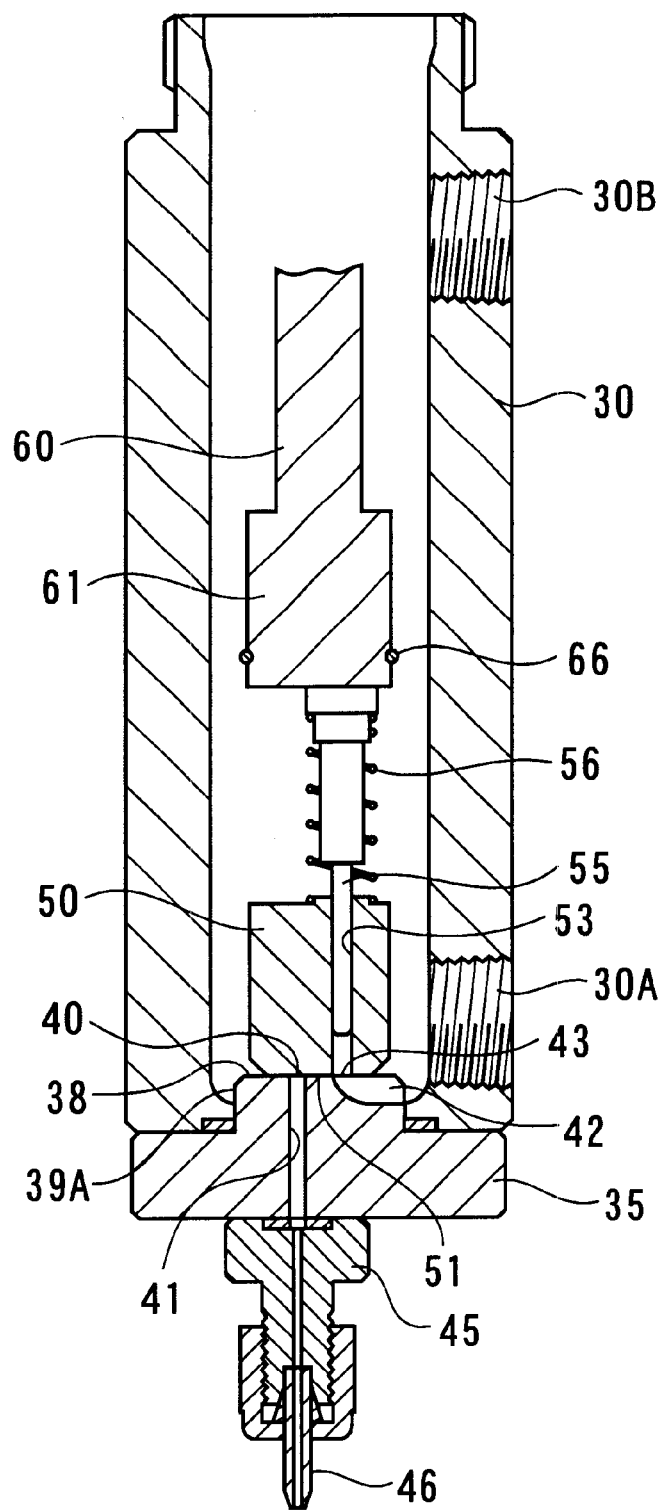
FIG. 7 is a cross section taken along 7—7 line in FIG. 3.
Figure 8:
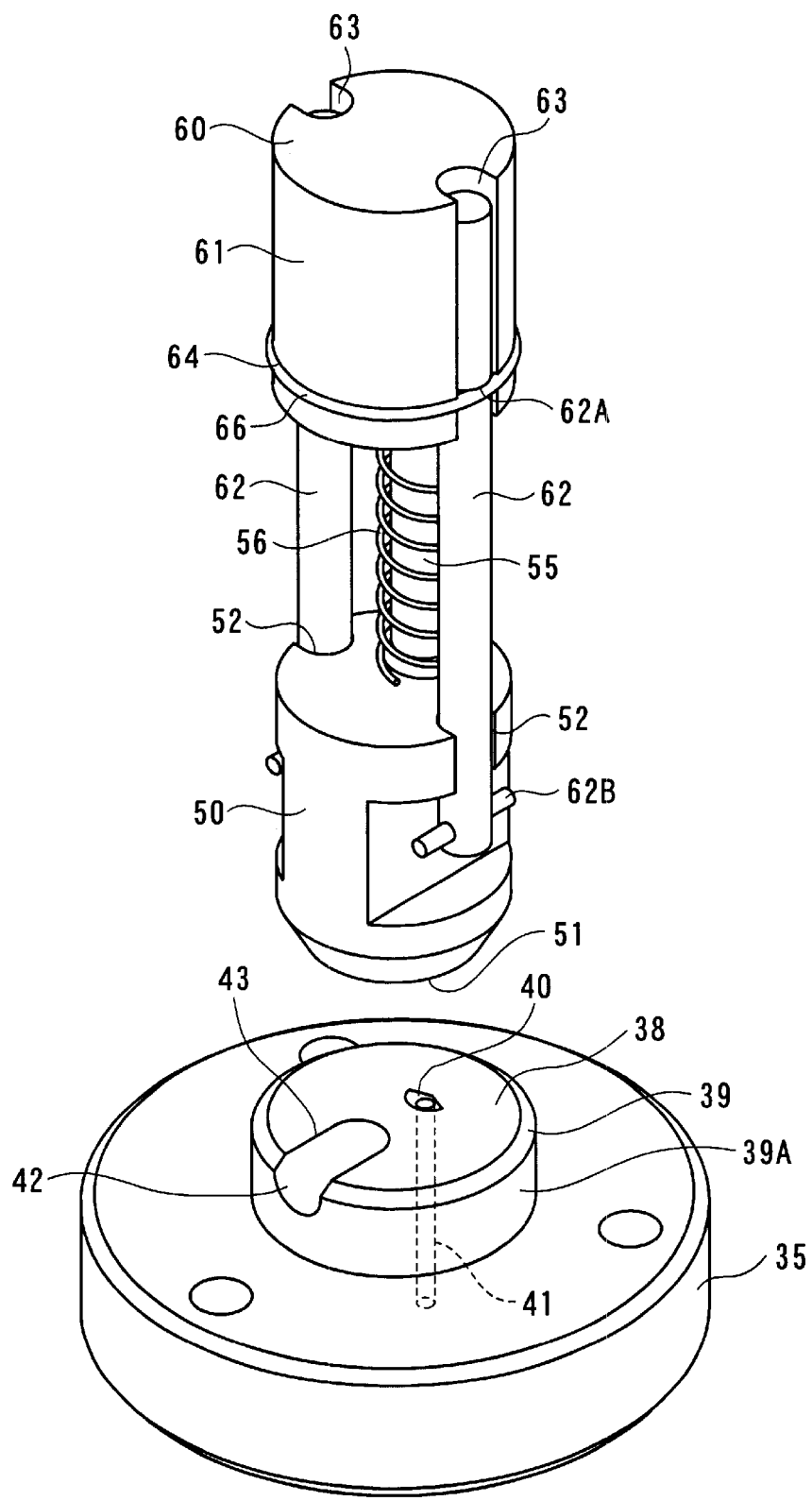
FIG. 8 is a perspective view showing a primary portion of the pump section of the aforesaid embodiment.
Figure 9:
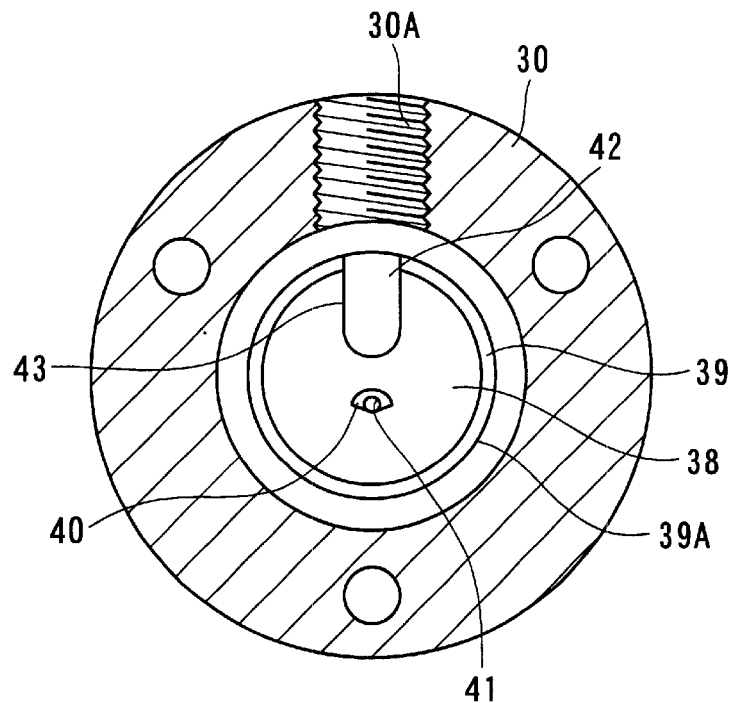
FIG. 9 is a cross section taken along 9—9 line in FIG. 3.
Figure 10:
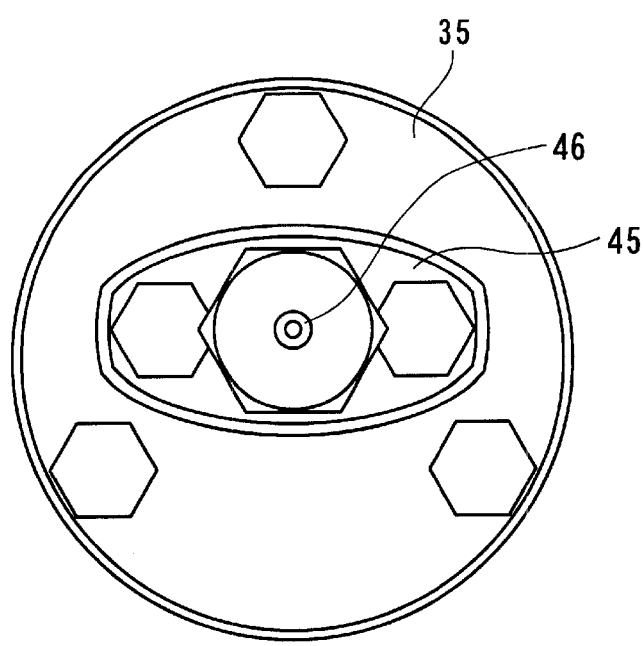
FIG. 10 is a bottom plan view of the aforesaid embodiment.

As shown in FIGS. 7 to 9, the valve block 35 is formed in stepped disk of short reverse T-shape, which includes a flat slide contact surface 38 facing an inside of the case 30, a tapered surface 39 and a side 39A continuous with the slide contact surface 38 and exposed in the case 30.

Further, the valve block 35 has a discharge port 41 penetrating the block in an axial direction from a discharge opening 40 formed on the slide contact surface 38, and a groove-shaped suction port 42 formed from the slide contact surface 38 to the tapered surface 39 and the side 39A.

Incidentally, the discharge opening 40 is larger than the diameter of the discharge port 41. A suction opening 43 is formed by an opening portion formed on the slide contact surface 38 of the suction port 42.

A discharge nozzle 45 having a discharge needle 46 is screwed to a lower side of the valve block 35, so that the liquid 7 discharged from the discharge port 41 is discharged from the discharge needle 46 through the discharge nozzle 45.

A liquid injection port 30A for supplying discharge liquid into the case 30 and a drain port 30B as air vent and drain are provided on the upper and lower sides of the case 30.

A pump block 50 adjacent to the valve block 35 and having approximately cylindrical entire configuration is located in the case 30.

A flat slide contact surface 51 in slidable contact with the slide contact surface 38 of the valve block 35 is formed on the lower distal end of the pump block 50.

Incidentally, in the present embodiment, the pump block 50 is formed of super engineering plastics such as polyamide-imide resin or ceramics, and the valve block 35 is formed of stainless steel. The slide contact surface 38 is coated with a diamond-like carbon film, which satisfies both of sealability and slidability when being in slidable contact with the slide contact surface 51 and is excellent in durability.

As shown in FIG. 8, two rotation transmitting rods 62 are engaged and fixed on a large-diameter portion 61 formed on the lower end of the pump-driving shaft 60. Specifically, on the outer circumference of the large-diameter portion 61, two engaging grooves 63 are formed in the axial direction of the large-diameter portion 61 and an engaging groove 64 is formed on a circumferential direction. A groove 62A is formed on the rotation transmitting rod 62 corresponding to the engaging groove 64. The upper end of the rotation transmitting rod 62 is disposed on the respective engaging groove 63 and an engaging member such as C-ring 66 having resilience is engaged to the engaging groove 64 and the groove 62A, so that the respective rotation transmitting rods 62 are capable of being attached to and detached from the large-diameter portion 61.

An engaging groove 52 for the two rotation transmitting rods 62 to be engaged is formed on the upper end of the pump block 50. Accordingly, when the pump-driving shaft 60 is rotated, the pump block 50 is rotated through the rotation transmitting rod 62 and the engaging rod 52.

Further, a pin 62B projects from a lower end of the rotation transmitting rod 62 in a direction orthogonal with the axis, so that the rotation transmitting rod 62 can be vertically moved relative to the pump block 50 within a range of the side notch of the pump block 50.

As shown in FIG. 7, a plunger insert hole 53 is formed penetrating the pump block 50. The plunger insert hole 53 is formed at a position capable of being in communication with the discharge opening 40 and suction opening 43 of the valve block 35 in accordance with the rotation of the pump block 50.

A plunger 55 is inserted to the plunger insert hole 53 and the coil spring 56 as a biasing means is interposed between the plunger 55 and the pump block 50. The plunger 55 is in constant contact with the large-diameter portion 61 of the pump-driving shaft 60 and the pump block 50 is biased toward the valve block 35, so that the slide contact surface 38 of the valve block 35 and the slide contact surface 51 of the pump block 50 are in slidable contact with each other at a predetermined pressure.

Incidentally, the diameter of the plunger 55 being inserted to the plunger insert hole 53 can be designed as desired. For instance, according to the thinnest arrangement, approximately 0.3 mm to 0.8 mm diameter is possible. On the other hand, there is no specific limitation in enlarging the diameter, which can be appropriately set according to discharge amount.

The coil spring 56 constantly biases the pump-driving shaft 60 through the plunger 55, so that the roller 65 is also in constant contact with the roller guide 24 of the guide member 20.

Next, a function of the present embodiment will be described below with reference to respective FIGS. 11(A) to 11(D). Incidentally, in FIGS. 11(A), 11(B), 11(C) and 11(D), the left figures respectively represent (from the upside) a cross section of the guide member 20, a cross section of the pump block 50 and the valve block 35 and a schematic illustration of the upper side of the valve block 35 and the plunger insert hole 53. The right figure shows another cross section of the pump block 50 and the valve block 35 seen from a side direction relative to the figure in the left (a position 90 degrees different from the left figure).

Initially, the liquid 7 is supplied in the case 30. The liquid 7 may be supplied by detaching the case 30 to put in the liquid 7 and attaching the case 30 thereafter, or alternatively, the liquid may be supplied from the liquid injection port 30A using a tube.

The discharge amount is set by manipulating the micrometer 80 in advance to incline the guide member 20. In the present embodiment, the discharge amount varies in accordance with the stroke of the plunger 55. The stroke is set according to the height dimension from the lower end position to the upper end position of the roller guide 24 of the guide member 20. The height dimension of the upper and lower position of the roller guide 24 is proportional to the inclination angle of the guide member 20 and the inclination angle is set by the position of the contact member 82, i.e. the position of the spindle 81 of the micrometer 80.

Accordingly, by measuring discharge of the micrometer per one scale, a scale corresponding to desired discharge amount can be calculated, so that the discharge amount can be adjusted only by manipulating the micrometer 80 to adjust the scales.

Figure 11A:
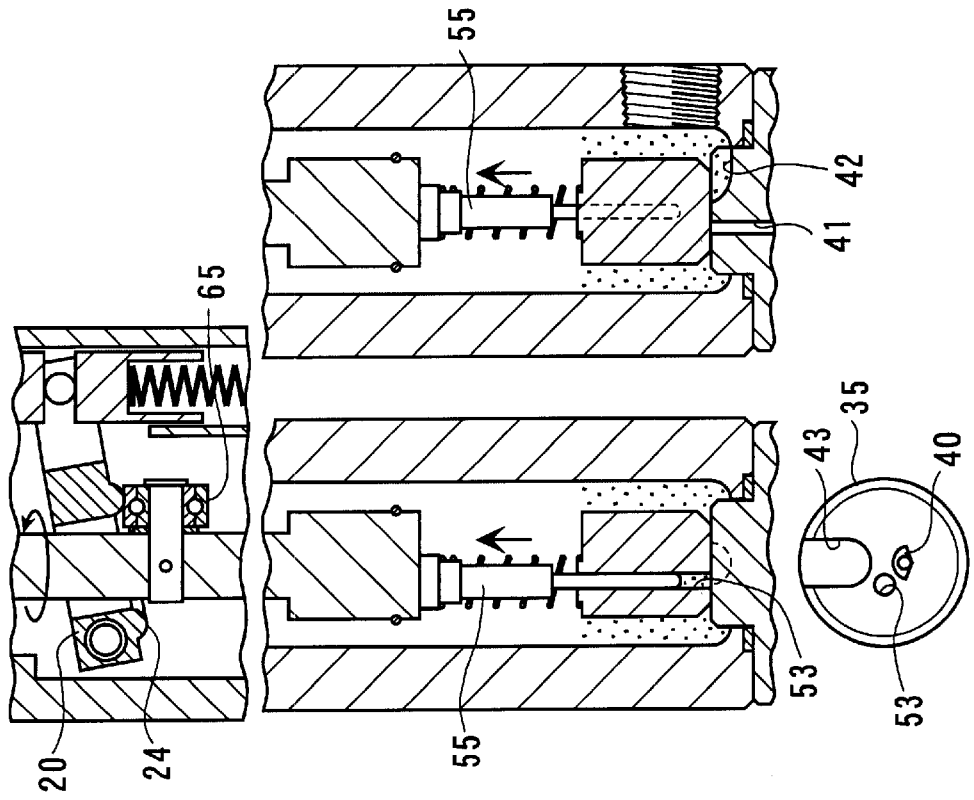
FIGS. 11(A) to 11(D) are illustrations showing movement of the pump section of the aforesaid embodiment.

Further, in the present embodiment, the origin is set at the condition shown in FIG. 11(A). In the origin condition, the plunger insert hole 53 is in communication with the suction opening 43. The plunger 55 is shifted to an intermediate position (a position between the upper and lower stroke end) from a lower stroke end (a position where the roller 65 is the closest to the fixed shaft 21 of the guide member 20) to an upper stroke end (a position where the roller is the closet to the contact shaft 25).

In the origin condition, when a start signal is inputted by pressing start button etc, the motor 11 is actuated to rotate the rotation interlocking member 12. The rotation of the rotation interlocking member 12 is transmitted to the pump block 50 through the rotation transmitting member 15, the pump-driving shaft 60 and the rotation transmitting rod 62 to rotate the pump block 50 while being in slidable contact with the valve block 35.

In accordance with the rotation, the plunger is gradually raised to suck the liquid 7 from the suction port 42 into the plunger insert hole 53 until the plunger insert hole 53 is shifted out of the suction opening 43.

Figure 11B:
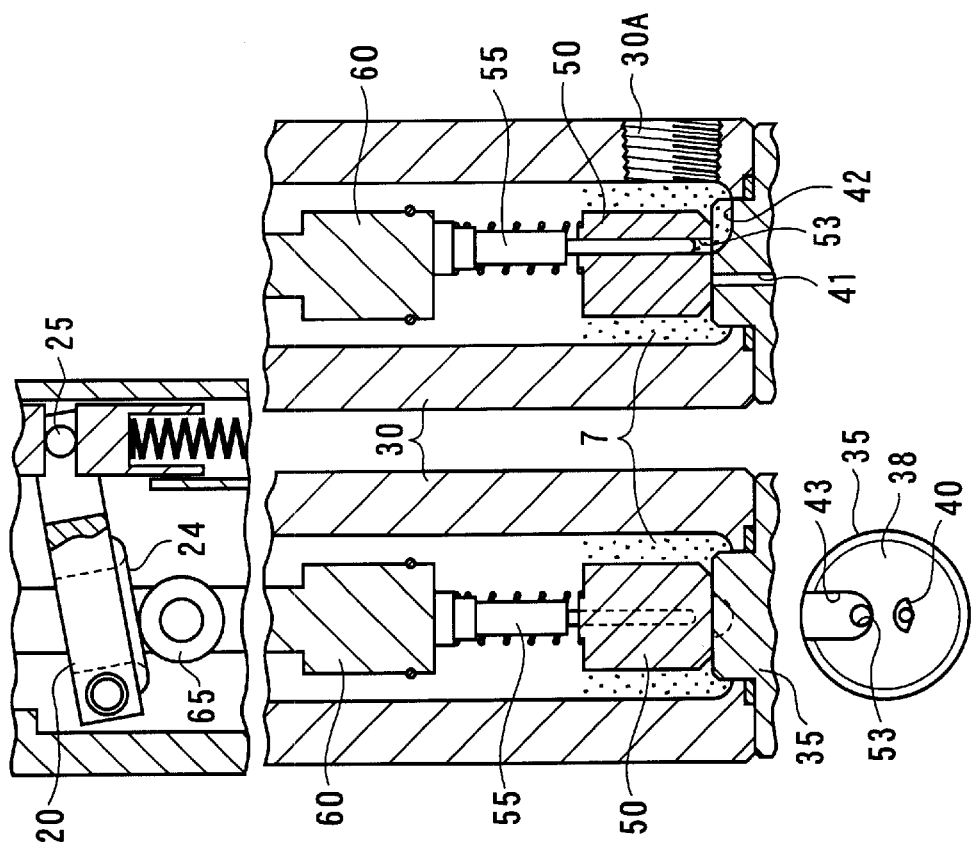

Then, when the plunger 55 is moved to the upper stroke end as shown in FIG. 11(B), the plunger insert hole 53 is at an intermediate position between the suction opening 43 and the discharge opening 40 and is completely isolated from the respective openings 43 and 40, so that the liquid 7 sucked in the plunger insert hole 53 is isolated from the other liquid.

Figure 11C:
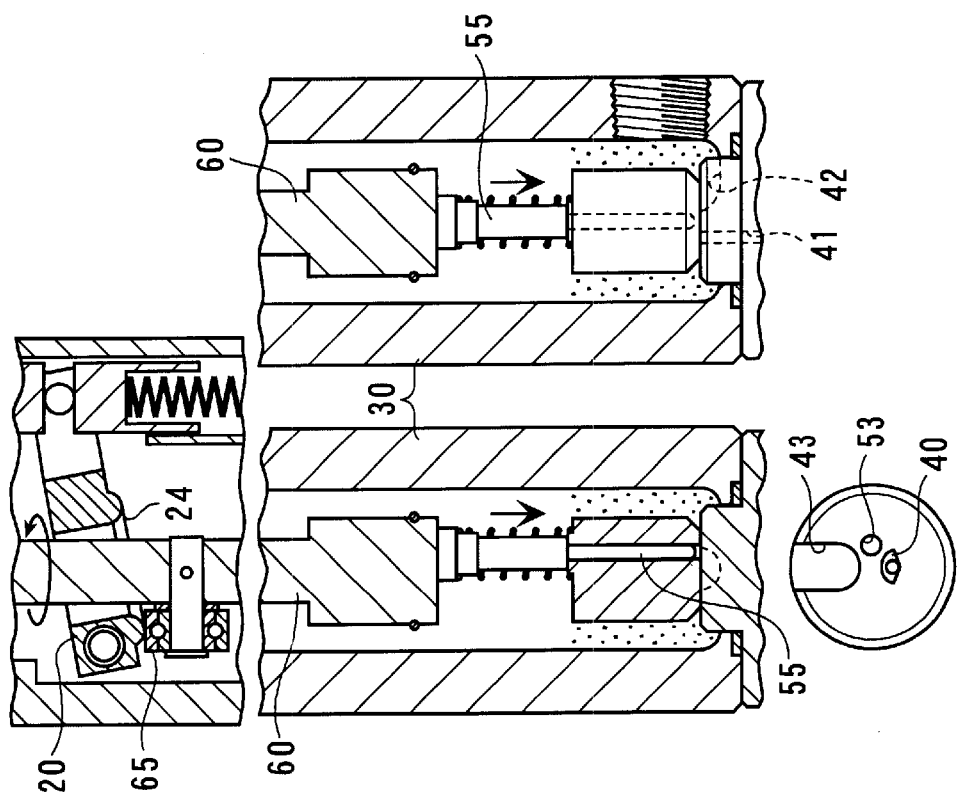

When the plunger 5 moves to an intermediate position between the upper stroke end and the lower stroke end after further rotation by the motor 11 as shown in FIG. 11(C), the plunger insert hole 53 moves to a position in communication with the discharge opening 40 and the plunger 55 keeps moving downward. In accordance with the movement, the liquid 7 in the plunger insert hole 53 is discharged from the discharge needle 46 through the discharge port 41.

Incidentally, the liquid 7 discharge is initiated when a part of the plunger insert hole 53 begins to be in communication with the discharge opening 40 and terminated when the plunger insert hole 53 is shifted out of the discharge opening 40, in other words, the liquid 7 is discharged from just before the condition shown in FIG. 11(C) to the time thereafter.

When the pump block 50 continues to rotate so that the plunger insert hole 53 is shifted out of the discharge opening 40, the discharge of the liquid 7 is terminated.

Figure 11D:
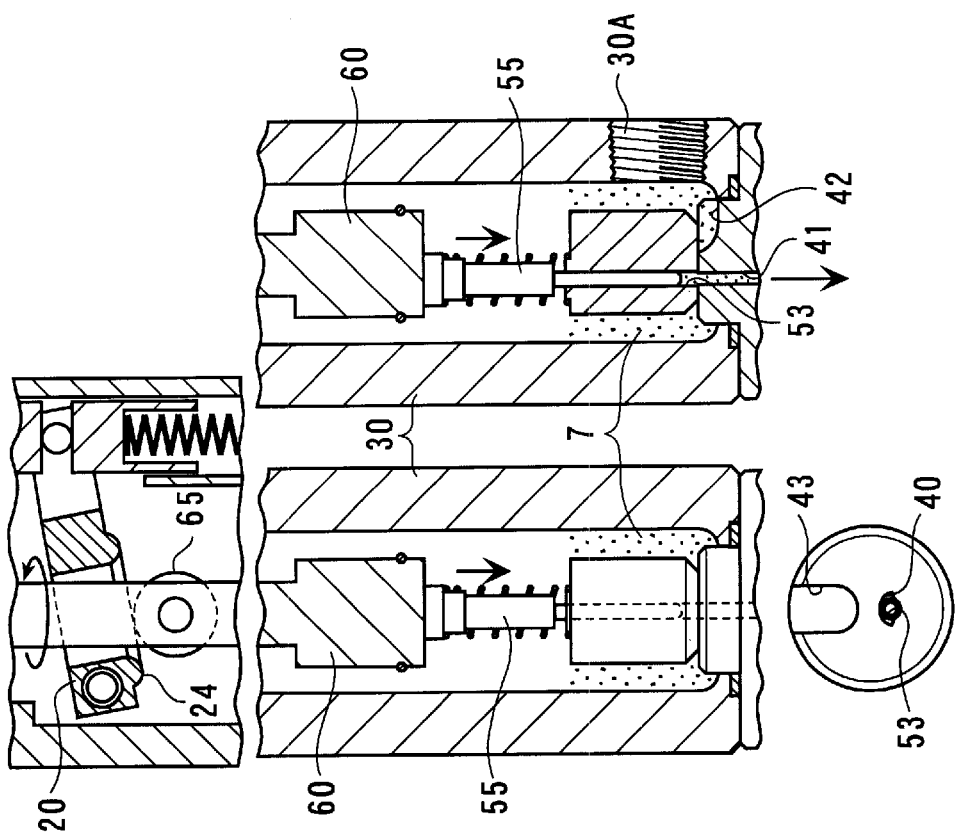

Thereafter, when the plunger 55 is moved to the lower stroke end as shown in FIG. 11(D), the plunger insert hole 53 is moved to an intermediate position between the discharge opening 40 and the suction opening 43 to be completely isolated from the openings 43 and 40.

When the pump block 50 is further rotated, the plunger 55 is raised and, after the plunger insert hole 53 is in communication with the suction opening 43, the liquid 7 is sucked into the plunger insert hole 53 in accordance with the upward movement of the plunger 55.

When returning to the condition shown in FIG. 11(A), the rotary position is detected by the rotary position detecting sensor 17 and the motor 11 is stopped.

The above respective steps are repeated to sequentially discharge a predetermined amount of the liquid 7. Incidentally, the motor 11 is continuously driven from FIG. 11(A) to FIG. 11(B), FIG. 11(C), FIG. 11(D) and back to FIG. (A), i.e. for one rotation, and is not stopped at the conditions shown in FIG. 11(B), FIG. 11(C) and FIG. 11(D).

As described above, the rotation of the pump-driving shaft 60 can be controlled per one rotation by the motor 11 and the rotary position detecting sensor 17. Accordingly, in the present embodiment, the rotary driving means for driving the pump-driving shaft by one rotation unit is constituted by the motor 11, the rotation interlocking member 12 and the rotary position detecting sensor 17.

Further, an advancement and retraction driving means is constituted by the guide member 20, the roller 65 as a follower portion, and the coil spring 56 for bringing the roller 65 into contact with the roller guide 24 of the guide member 20.

According to the present embodiment, following advantages can be obtained.

(1) Since the guide member 20 and the roller 65 are provided and the pump-driving shaft 60 is vertically moved in accordance with the rotary movement of the pump-driving shaft 60 by the motor 11, high-speed rotation can be achieved as compared to an arrangement using a ball screw and a clutch. Specifically, the pump-driving shaft 60 and the plunger 55 conduct a vertical movement with smooth acceleration change in accordance with rotary movement, so that high-speed rotation is possible and the speed of liquid discharge movement can be easily increased.

(2) Since the discharge opening 40 and the suction opening 43 have larger area than the plunger insert hole 53, suction movement and discharge movement can be continued while the plunger insert hole 53 is moved at the portion of the respective openings 40 and 43. Accordingly, it is not necessary to stop the rotation of the pump block 50 during suction or discharge, and the suction and discharge movement can be conducted while rotating the pump block 50, thereby easily achieving further high-speed rotation.

Accordingly, one rotation of the pump block 50, i.e. one discharge movement, can be conducted within less than 0.1 second, so that discharge speed of more than 10 rotation per second required at production line of semiconductor device can be satisfied.

(3) Since the guide member 20 and the roller 65 are used for vertically moving the pump-driving shaft 60 and no ball screw is required, durability can be enhanced and component exchange cycle can be lengthened, thereby facilitating maintenance of the dispenser.

(4) Since a planar valve plunger pump method is used where the pump block 50 is rotated while being in slidable contact with the valve block 35 to switch the discharge opening 40 and the suction opening 43 formed on the slide contact surface 38, it is only necessary for the plunger 55 to advance and retract in the plunger insert hole 53. Accordingly, it is not required for the plunger to switch the openings by its own rotation as in the D-cut plunger pump, so that the diameter of the plunger 55 can be made extremely thin. Therefore, the discharge amount of the liquid 7 being set by the diameter and stroke of the plunger 55 can be made extremely small, where very small amount of liquid discharge such as micro- to nano-liters can be easily achieved.

(5) Since only one plunger 55, or only one plunger insert hole 53, is provided, the area of the planar portion having no plunger insert hole 53 and the respective openings 40 and 43 can be set large on the respective slide contact surfaces 38 and 51. Accordingly, sealability by mutual slide contact of the slide contact surfaces 38 and 51 can be improved, thereby securely sealing the space between the suction opening 43 and the discharge opening 40.

Further, since the area of the planar portion is large, the plunger insert hole 53 can be securely isolated from the respective openings 40 and 43 while moving the plunger insert hole 53 from the suction opening 43 to the discharge opening 40, thereby improving discharge accuracy.

Since only one plunger insert hole 53 and the plunger 55 are provided, one discharge movement can be conducted by one rotation of the pump-driving shaft 60, i.e. by one rotation of the pump block 50, so that the discharge movement per one time can be made identical and accuracy of discharge amount per one time can be improved.

(6) Since the discharge amount can be adjusted only by manipulating the micrometer 80 to change the inclination angle of the guide member 20, the discharge amount can be easily adjusted. Accordingly, the discharge amount can be easily adjusted as compared to an arrangement using a cam and the discharge amount can be adjusted while actuating the dispenser 1, thereby enhancing usability of the dispenser 1.

Further, since the discharge amount is in proportion to the scale of the inclination angle of the guide member 20, i.e. the scale of the micrometer 80, the discharge amount can be accurately and securely adjusted by the scale of the micrometer 80.

Since the displacement of the contact shaft 25 is enlarged in proportion to the displacement (displacement in height direction) of the roller guide 24 of the guide member 20, the movement of the roller guide 24 in response to manipulation of the micrometer 80 is reduced, thereby easily conducting minute adjustment of the discharge amount.

(7) Since the guide member 20 is arranged to move by the micrometer 80 and the biasing member from a position where the fixed shaft 21 and the contact shaft 25 are at the same height, i.e. at the horizontal condition, to a position where the contact shaft 25 is located above the fixed shaft 21, i.e. where the contact shaft 25 is moved upward to incline the guide member 20, the lower stroke end of the plunger can be made constant. Accordingly, by setting the lower stroke end of the plunger 55 at a position around the lower end opening of the plunger insert hole 53, the dead space in the plunger insert hole 53 generated when the plunger 55 is moved to the lower stroke end can be reduced to prevent residence of the liquid 7 in the plunger insert hole 53. Further, the adjustment range of the upper stroke end of the plunger 55 changed by the inclination angle of the guide member 20 can substantially cover the entire range of the plunger insert hole 53 (from lower end to the upper end), thereby enlarging adjustment range of the discharge amount.

(8) Since the diamond-like carbon film is coated on the slide contact surface 51, the sealability and slidability of the slide contact surfaces 38 and 51 can be improved, thereby greatly improving the performance of the planar valve.

(9) Since the plunger insert hole 53 is in communication with the suction opening 43 and the discharge opening 40 is shut by the slide contact surface 51 at the termination condition shown in FIG. 11(A), liquid leakage can be prevented.

(10) Since the valve block 35, the pump block 50, the plunger 55 etc. are disposed in the case 30 for the liquid 7 to be put in, even when the liquid 7 is leaked from the slide contact surface of the plunger insert hole 53 and the plunger 55, the liquid 7 only returns to the case 30 and does not leak out to the outside of the pump section 3 and the driving section 2 side.

Accordingly, it is not necessary to provide a sealing member such as an O-ring on the pump section 3 for preventing liquid leakage from the slide contact surface, thereby simplifying structure and reducing production cost thereof. Further, since the sealing member is not necessary, exchange work of sealing member, which becomes periodically necessary when the sealing member is provided, can be eliminated.

(11) Even when air bubble enters in the plunger insert hole 53, the air bubble is discharged toward the case 30 through the slide contact surface between the plunger insert hole 53 and the plunger 55 and does not stay in the plunger insert hole 53, fluctuation of the discharge amount on account of the air bubble contained in the liquid 7 sectioned in the plunger insert hole 53 can be prevented, thereby improving accuracy in discharging very small amount of the liquid 7.

Incidentally, since there is no seal on the slide contact surface of the plunger insert hole 53 and the plunger 55, the liquid 7 may be slightly leaked out therefrom. However, since the discharge movement is repeatedly conducted by rotating the pump block 50 once and the leakage amount of the liquid 7 is constant per one discharge movement, the discharge movement per one rotation can be made constant, thereby securing sufficient accuracy.

Further, even if air bubbles are accumulated in the plunger insert hole 53 when the liquid 7 containing the air bubble generated in sucking the liquid 7 or inherently containing air bubble is discharged, the air bubbles are concentrated on the upper side of the plunger insert hole 53 and can be pushed up by the liquid 7 leaking out of the slide contact surface between the plunger 55 and the plunger insert hole 53 during slide movement of the plunger 55 to be discharged from the upper end of the plunger insert hole 53, so that the air bubbles can be prevented from being accumulated in the plunger insert hole 55, thereby improving accuracy of discharge amount.

(12) Since the single coil spring 56 works both as a pressing spring for bringing the pump block 50 into contact with the valve block 35 and the pressing spring for bringing the roller 65 into contact with the roller guide 24, the number of components can be reduced, thereby reducing the production cost.

(13) Since the case 30 is provided to the pump section 3 and the liquid 7 is put into the case 30, the distance for the liquid 7 to be moved can be shortened, so that liquid 7 of high viscosity can be securely supplied to the plunger insert hole 53 without providing any pressurizing means. Further, since the moving distance of the liquid 7 is short, sucking efficiency can be improved.

Further, since there is no need for transferring means such as a squeeze pump in detaching the case 30 to fill up the liquid 7, the structure can be simplified and the dispenser 1 can be inexpensively provided.

(14) When the discharge amount is small relative to the volume of the case 30 as in the case of discharging very small amount of liquid 7, since half or one day discharge amount can be secured by filling the case 30 with the liquid 7, the workability and productivity are not hindered even when the liquid 7 is supplemented by detaching and attaching the case 30. Incidentally, the supplement time of the liquid 7 can be easily managed by providing a level indicator or setting supplement cycle in view of the discharge amount per a predetermined time.

(15) Even when a means for transferring the liquid 7 from a tank storing the liquid 7 using a squeeze pump is provided to the case 30, since the liquid 7 is once accumulated in the case 30, the pressure of the pressurized liquid 7 can be decompressed. Accordingly, the pressure at the pump section 3 can be lowered even when the squeeze pump is used, thereby preventing liquid leakage by pressurizing.

(16) When a highly viscous liquid 7 such as a paste is used, the discharge of the liquid 7 can be delayed when the pump section 3 and the discharge port 41 are spaced apart. However, according to the present embodiment, since the plunger 55 and the discharge port 41 discharging the liquid 7 and the discharge needle 46 are adjacently located, the delay in discharge of the liquid 7 can be prevented.

(17) In a conventional pump, a solvent of low boiling point such as alcohol, which therefore is easily vaporized, is likely to generate bubble in a complicated flow such as in being sucked into the pump or in passing a check valve and the bubble is accumulated to prevent the liquid 7 from being discharged. However, according to the present embodiment, since the pump section 3 and the discharge port 41 are located adjacently and the liquid can be sucked from the relatively large suction port 42, thus enlarging the suction area of the liquid 7, the liquid 7 can be smoothly flowed without complicating the flow, so that the bubble can be prevented from generating by reducing suction negative pressure and the liquid 7 can be normally discharged. Accordingly, the present pump dispenser can be used for discharging easily-vaporizing liquid 7.

Even when the bubbles are generated, since the bubbles have relatively small specific gravity as compared to the liquid 7, the bubbles moves toward upper side of the case 30. Accordingly, the bubbles do not remain on the pump block 50 and the valve block 35 at the lowermost end of the case 30, so that the liquid 7 containing no bubbles can be constantly discharged. Further, since the pump block 50 and the valve block 35 are formed at the lowermost end of the case 30, the liquid 7 can be sucked and discharged from the deepest bottom of the case 30, residual liquid can be reduced and sedimentation of deposit can be prevented.

(18) Since the discharge port 41 and the suction port 42 of the valve block 35 are sealed by the slide contact surfaces 38 and 51 slidably contacting at the end surface in the direction orthogonal with the axis, the discharge port 41 and the suction port 42 can be sufficiently sealed without requiring rubber such as O-ring. Accordingly, fluctuation of discharge amount on account of deformation of the sealing member can be eliminated, so that highly accurate discharge can be conducted even by the very small amount of liquid 7.

(19) The discharge amount of the liquid 7 per one discharge movement can be easily adjusted by adjusting the inclination angle of the guide member 20 by the micrometer 80 and the discharge speed can be easily adjusted only by controlling the rotary speed of the motor 11, thereby improving usability thereof.

Further, since the liquid 7 is sucked and discharged by the movement of the plunger 55, the accuracy of the discharge amount can be improved as compared to a pump discharging the liquid by air pressure, thereby accurately discharging very small amount of the liquid 7.

(20) Since the case 30, the valve block 35, the pump block 50 etc. in contact with the liquid 7 in the pump section 3 can be formed by a material superior in chemical resistance such as stainless steel and ceramics, various discharge liquid 7 can be used. Further, since the pump section 3 and the driving section 2 are separated, the relatively expensive ceramics may be used only for the pump section 3, so that chemical-resistant dispenser 1 can be provided at a low cost.

(21) The case 30 of the pump section 3 can be easily separated from the driving section 2 by detaching the cap nut 31. Accordingly, the pump section 3 may be independently washed, so that maintenance work can be facilitated and the type of the discharged liquid 7 can be easily changed.

Further, by detaching the C-ring 66, the pump-driving shaft 60, the rotation transmitting rod 62, the pump block 50 and the plunger 55 can be easily disassembled, thereby facilitating maintenance work and assembly efficiency.

Further, since the pump-driving shaft 60 can also be separated into the drive-side driving shaft 60A and the pump-side driving shaft 60B, the pump-side driving shaft 60B can be easily detached from the driving section 2 by detaching the connector 5, thereby facilitating washing and assembly thereof.

(22) Conventionally, two stepping motors are generally used for two different motions such as rotary motion of the pump block 50 and the advancement and retraction of the plunger 55, so that the size reduction of the driving section 2 has been difficult and production cost can be increased. However, in the present embodiment, the guide member 20 and the roller 65 are provided to achieve both the rotary motion of the pump block 50 and the advancement and retraction of the plunger 55 and only one motor 11 is required, the size and production cost of the dispenser 1 can be reduced.

Further, in order to conduct vertical movement using cam mechanism, different cams has to be installed for changing upper and lower strokes of the plunger 55, where a plurality of dispenser 1 of different strokes are used or, alternatively, the cam has to be exchanged by disassembling the dispenser 1. On the other hand, according to the present embodiment, since the guide member 20 capable of adjusting inclination angle is thereof provided, the stroke can be easily adjusted and production cost thereof can be reduced.

Incidentally, the scope of the present invention is not restricted to the specific arrangement of the above embodiment, but includes modifications as long as an object of the present invention can be achieved.

Figure 12:
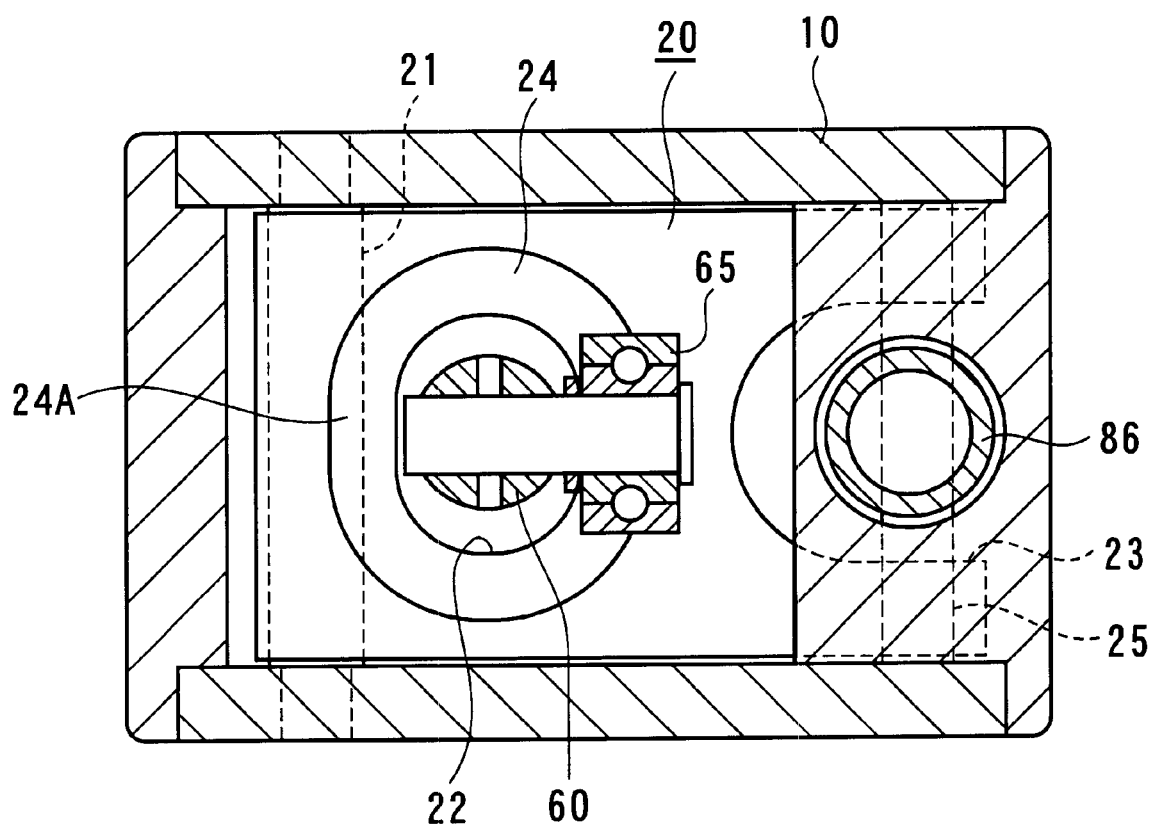
FIG. 12 is a cross section showing a guide member according to modification of the present invention.

For instance, the guide member 20 may not be arranged as described in the above embodiment. As shown in FIG. 12, the roller guide 24 may not be circular but may have a parallel portion 24A parallel to the portions to be the lower stroke end and the upper stroke end, i.e. the portion to be adjacent to the fixed shaft 21 and the portion to be adjacent to the contact shaft 25. By providing the guide member 20 with the roller guide 24 having the parallel portion 24A, when the roller 65 moves at the parallel portion 24A, i.e. in switching the discharge motion and the sucking motion, and the plunger insert hole 53 is shut by the slide contact surface 38, since the plunger 55 is stopped at the lower stroke end and the upper stroke end without vertical movement, the movement can be further stabilized.

Further, as the guide member 20, uneven surface may be provided on a part of the roller guide 24 to form a configuration other than flat surface, and the valve may be switched after the liquid is sucked in from the discharge port 41 by temporarily raising the plunger 55, thereby reducing residual liquid at the distal end of the discharge needle 46 at the end of discharging process.

Though the liquid 7 is supplied into the case 30 in the above embodiment, an independent case may be used.

Figure 13:
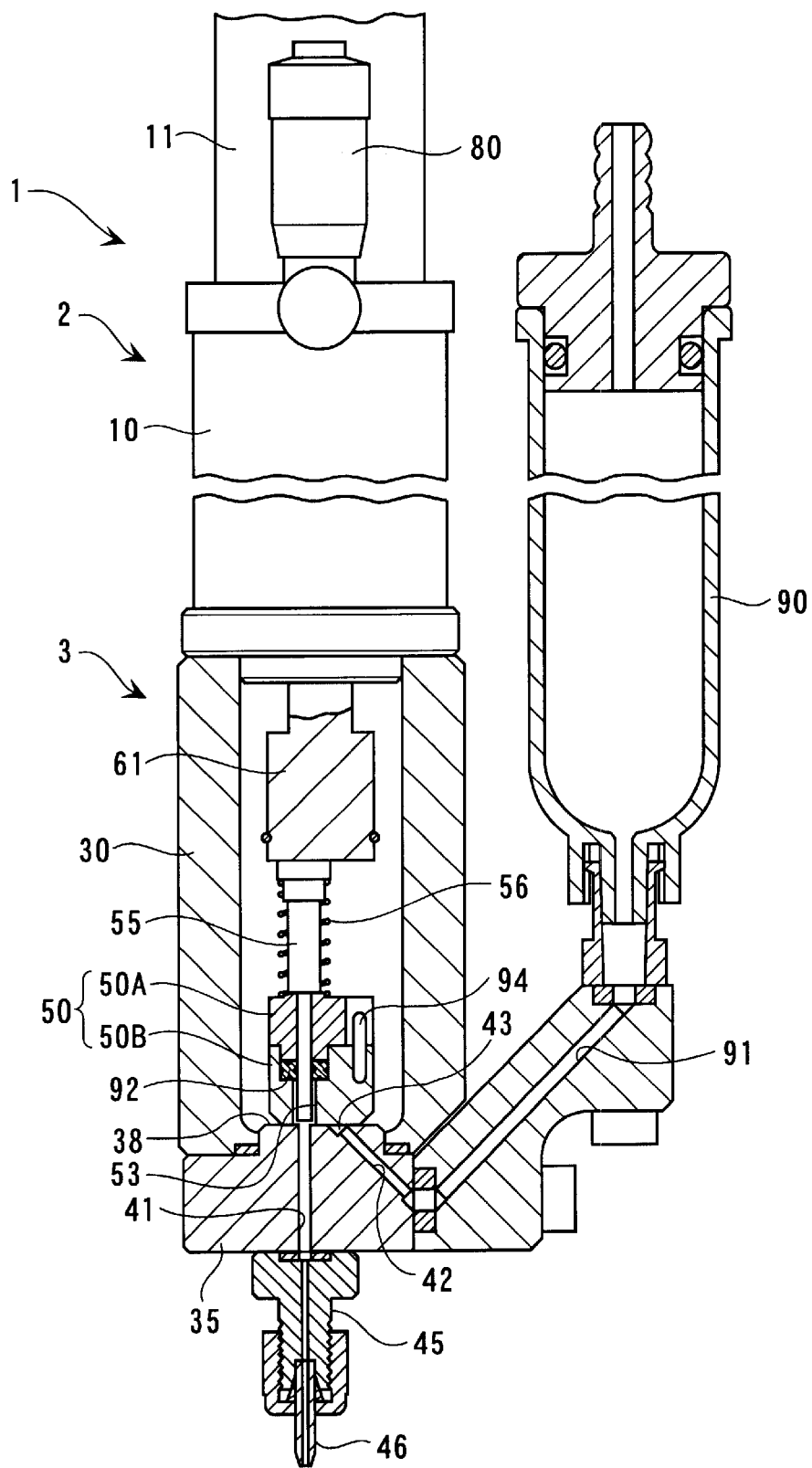
FIG. 13 is a schematic cross section showing a dispenser according to another embodiment of the present invention.

For instance, as shown in FIG. 13, a case 90 for the liquid 7 to be put in may be independently provided, where a channel for supplying the liquid 7 from the case 90 to the suction opening 43 facing the slide contact surface 38 through the suction port 42 formed on the valve block 35 is formed. Incidentally, in this arrangement, a seal member 92 is provided on the slide contact surface of the plunger 55 and the plunger insert hole 53 in order to prevent the liquid 7 from leaking out into the case 30 from the plunger insert hole 53. The pump block 50 are divided into two parts of an upper block 50A and a lower block 50B for providing the seal member 92, which are connected and rotation-prevented by a pin 94.

By independently providing the case 90, the case 90 can be easily exchanged and expensive liquid 7 sold in the case 90 can be easily handled. Further, since the liquid doesn't enter into the case 30, the inside of the case 30 is not necessary to be washed when the type of the discharged liquid 7 is changed, thereby facilitating the maintenance work.

Figure 14:
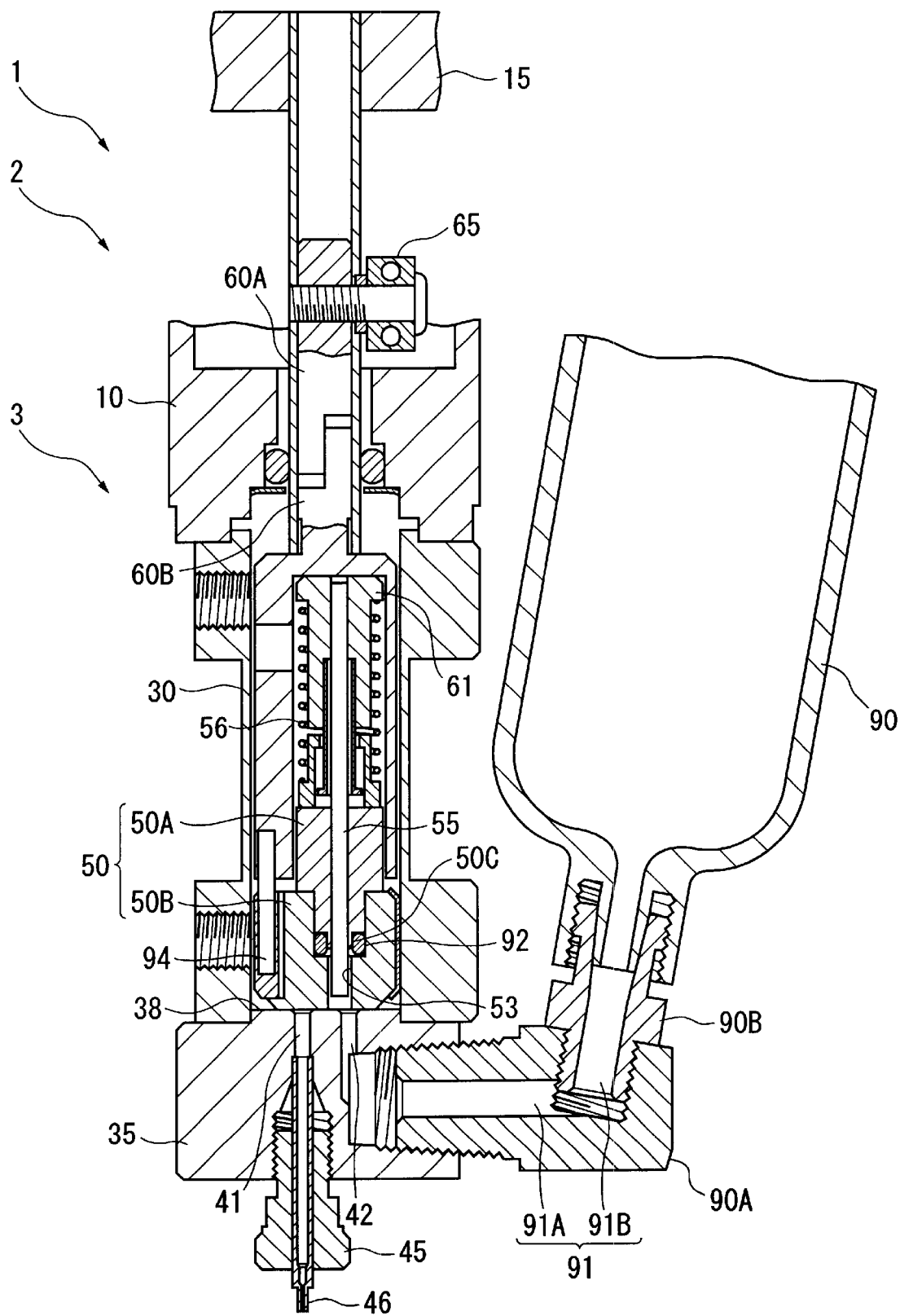
FIG. 14 is another schematic cross section showing a dispenser according to still another embodiment of the present invention.

On the other hand, an independent case as shown in FIG. 14 and a plunger seal mechanism may be used.

According to the arrangement of FIG. 14, connectors 90A and 90B for connecting the case 90 to which the liquid 7 is put in in an inclined manner are used and the liquid 7 from the case 90 is sucked by the pump to be supplied to the suction opening 43 facing the slide contact surface 38 through liquid supply channels 91A and 91B formed inside the connectors 90A and 90B and the suction port 42 of the valve block 35. Further, in order to prevent the liquid 7 from leaking out of the plunger insert hole 53, the seal member is provided in the same manner as the arrangement of FIG. 13 and a lip portion 50C not shown in FIG. 13 is formed between the seal member 92 and the plunger 55.

The lip portion 50C is continuously formed from the upper block 50A of the pump block 50 and the inner diameter thereof is slightly smaller than the outer diameter of the plunger 55. For instance, the inner diameter of the lip portion 50C is within the range of 0.01 to 0.50 mm smaller than the outer diameter of the plunger 55. Further, since the upper block 50A is made of elastic cross-linked PTFE, the lip portion 50C also has elasticity. The lip portion 50C is in close contact with the outer circumference of the plunger 55 on account of dimension setting and elasticity thereof and, being clamped by the outside seal member 92, further securely in contact with the outer circumference of the plunger 55. Such lip portion 50C is formed slightly upper than the distal end of the plunger 55 when the plunger 55 is at the upper end stroke. Accordingly, as long as the plunger 55 is moved within the stroke range, the lip portion 50C is in constant contact with the plunger 55 for sealing.

According to the arrangement shown in FIG. 14, since the lip portion 50C is integrally formed with the pump block 50, the seal can be conducted with the entire pump block 50 in contrast with a conventional arrangement using independent small seal member, so that the number of components can be reduced, thereby facilitating handling thereof and improving assembly workability.

Further, since the lip portion 50C is integrally formed with the pump block 50, there is no error caused by change in the discharge amount on account of the movement of the seal member 92, very small amount of liquid can be discharged with high accuracy. Further, since there is no liquid leakage from the lip portion 50C, the liquid 7 can be discharged with high accuracy in proportion to the movement of the plunger 55.

Further, since there is no shaft shift between the lip portion 50C and the plunger insert hole 53 as in the case of using an independent seal member 92, the stroke of the plunger is not inclined and biased abrasion of a part of the lip portion 50C can be prevented. Accordingly, the life of the upper block 50A of the pump block 50 can be lengthened and exchange frequency can be reduced even when the lip portion 50C is integrated with the upper block 50A.

Further, since it is not necessary to solely handle the seal member and to provide a seal arranging groove, the size of the pump block 50 can be restrained to the minimum. Accordingly, the size of the drive mechanism such as a motor 11 for driving the pump block 50 can also be reduced, thereby reducing the entire size and production cost of the dispenser 1.

Since the case 90 is independently provided, the case 90 can be easily exchanged as in FIG. 13 and expensive liquid 7 sold being packed in the case 90 can be easily handled. Further, since the liquid doesn't enter into the case 30, the case 30 is not necessary to be washed in changing the discharged liquid 7, thereby facilitating the maintenance work.

Figure 15:
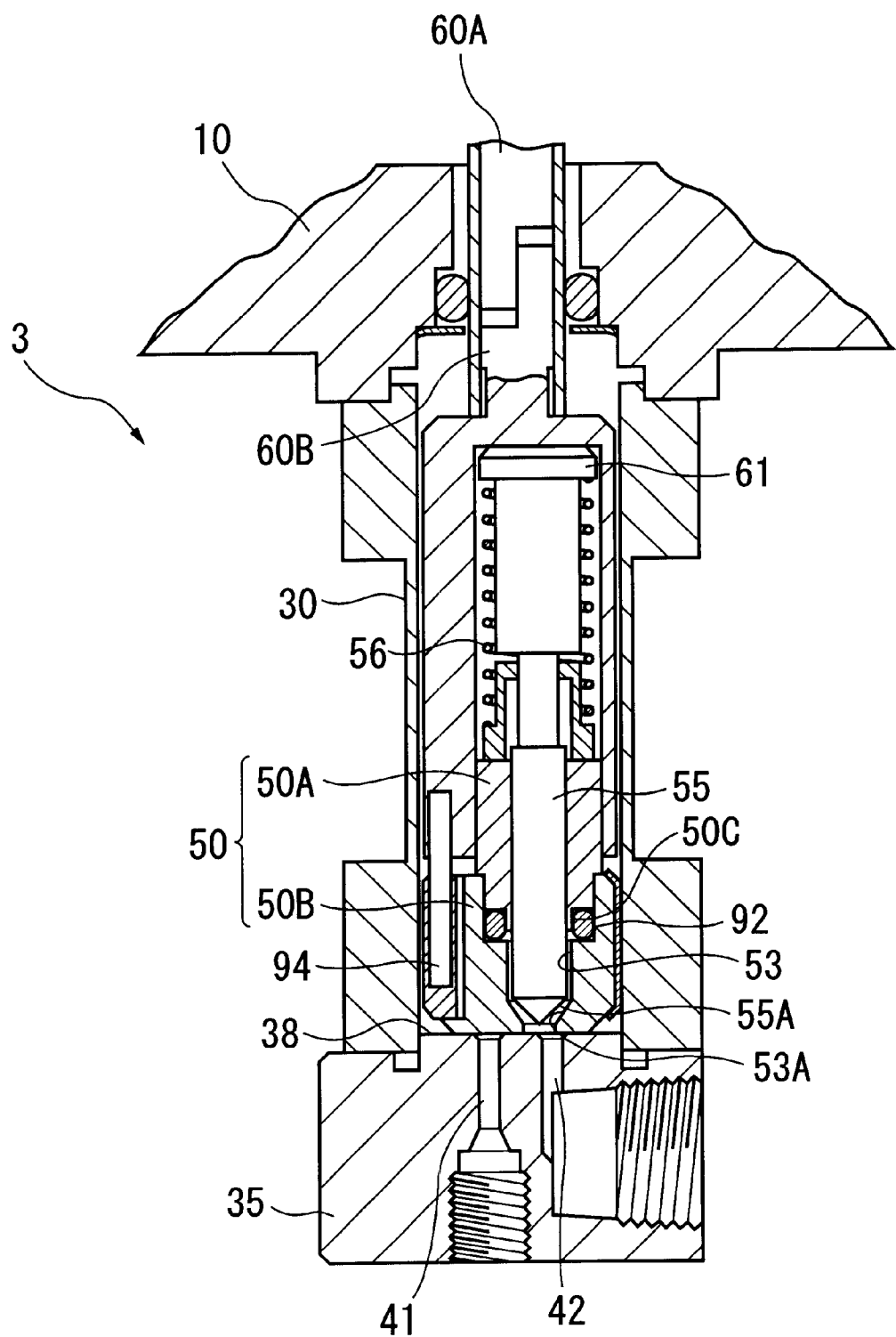
FIG. 15 is still another schematic cross section showing a dispenser according to further embodiment of the present invention.

A pump block 50 and a plunger 55 shown in FIG. 15 may be used in the present invention. Incidentally, in FIG. 15, the same reference numeral will be attached to the components having described above to omit description thereof.

In the arrangement of FIG. 15, a plunger insert hole 53 formed in the pump block 50 and the plunger 55 have greater diameter than that in FIG. 14, thereby increasing projection amount with the same movement stroke.

The lower block 50B of the pump block 50 is a slide contact surface 51, where the sealability is secured by securing the close contact area against the slide contact surface 38 of the valve block 35. Accordingly, even when the diameter of the plunger insert hole 53 and the plunger 55 is enlarged, it is desirable to prevent enlargement of the opening area of the plunger inert hole 53 in order to secure the sealability. Accordingly, a tapered portion 53A is formed adjacent to the opening on the side of the slide contact surface 51 of the plunger insert hole 53. Another tapered portion 55A is also formed on the distal end of the plunger 55 so as not to interfere with the tapered portion 53A of the plunger insert hole 53. Accordingly, the close contact area between the slide contact surface 51 of the pump block 50 and the slide contact surface 38 of the valve block 35 can be sufficiently obtained in spite of increase in the diameter of the plunger insert hole 53 and the plunger 55.

Incidentally, when the tapered portion 55A and the tapered portion 53A are formed on the plunger 55 and the plunger insert hole 53, it is desirable that the tapered angle of the tapered portion 55A is set at, for instance, 45 degrees relative to the slide contact surface 51 and the tapered portion 53A is set at, for instance, 60 degrees in the same manner, so that the gap formed between the tapered portion 53A and the tapered portion 55A when the plunger 55 is advanced becomes wider toward the slide contact surface 51. Accordingly, even when air bubbles are mixed in initiating the movement, the air bubbles come close to the outlet side, i.e. to the slide contact surface side 51, and can be easily discharged.

The respective components necessary for the present invention are not restricted to the above-described embodiments, but any existing mechanism may be used as necessary.

The rotary driving means of the pump block 50 is not restricted to those using the motor 11 and the rotary position detecting sensor 17. For instance, the position may be detected using an encoder installed in the servomotor 11 without providing the rotary position detecting sensor 17. More specifically, when a servomotor having incremental encoder with Z-phase for outputting one pulse per one rotation or another servomotor having absolute-type encoder capable of detecting absolute position thereof is used as the motor 11, the rotary position detecting sensor 17 is not necessary.

Further, the rotary driving means may be a motor and one-rotation clutch, which may be any driving means capable of controlling the pump-driving shaft 60, i.e. the pump block 50 per one rotation and may be selected according to specific use.

Further, though the origin position is set at the condition shown in FIG. 11(A) where the plunger insert hole 53 is in communication with the suction opening 43, other position such as the one shown in FIG. 11(C) where the discharge opening 40 is in communication with the plunger insert hole 53 may be set as the origin position in accordance with the type of the liquid 7 to be discharged. However, by setting the condition shown in FIG. 11(A) as the origin position, since the discharge opening 40 is shut by the pump block 50 when the dispenser 1 is stopped, liquid leakage can be securely prevented.

The arrangement for adjusting the inclination angle of the guide member 20 is not restricted to the above-described embodiment, but may include an arrangement where the fixed shaft 21 is unrotatably fixed to the guide member 20 and a handle may be provided to the fixed shaft 21, whereby the fixed shaft 21 is directly rotated to incline the guide member 20.

A member for inclining the guide member 20 such as the micrometer 80 and the handle may be electrically controlled so that, when the dispenser is installed in a production line, the discharge amount can be changed by electrically driving the micrometer 80 etc. in accordance with products on the production line. According to such arrangement, the discharge amount can be automatically adjusted in accordance with the products, thereby automating discharge adjustment in accordance with specific product on the production line where various products flow in a mixed manner, so that the dispenser can be easily incorporated in the automated production line.

Further, though the contact shaft 25 is moved toward the motor 11, i.e. away from the valve block 35, relative to the fixed shaft 21 when the guide member 20 is inclined in the aforesaid embodiment, the contact shaft 25 may be moved closer to the valve block 35 relative to the fixed shaft 21. Further, the contact shaft 25 may be arranged to be movable both toward the motor 11 and toward the valve block 35 around the fixed shaft 21.

Though the fixed shaft 21 is formed on an end of the guide member 20, the fixed shaft may be provided at the center between the both ends of the guide member 20 or at a portion on which the through hole 22 is formed.

Further, the suction port 42 of the valve block 35 is not restricted to be of groove-shape, but may be formed inside the valve block 35 to intercommunicate the suction opening 43 and the opening formed on the side 39A. Further, the shape and the size of the discharge opening 40 may be designed at will. The configuration of the case 30 of the pump section 3 and the entire configuration of the dispenser 1 may be designed in accordance with specific use.

What is claimed is:

1. A pump dispenser, comprising:

a valve block having a first slide contact surface;

a pump block having a second slide contact surface adapted to be in contact with the first slide contact surface of the valve block;

a plunger inserted to a single plunger insert hole drilled along an axial direction of the pump block, the plunger being slidable in the axial direction;

a pump-driving shaft supported by the pump block, the pump-driving shaft being rotatable with the pump block and advanceable toward and retractable from the pump block together with the plunger;

a rotary driver for controllably rotating the pump-driving shaft per one rotation unit; and an advancement and retraction driver for advancing and retracting the pump-driving shaft relative to the valve block, wherein the valve block has a discharge port for intercommunicating a discharge opening formed on the first slide contact surface with a discharge hole formed on an outside opposite to the first slide contact surface and a suction port for intercommunicating a suction opening formed on the first slide contact surface with a supply hole facing a liquid supply side, wherein the plunger insert hole of the pump block is drilled at a position capable of being in communication with the discharge opening and the suction opening of the valve block along an axial direction, and wherein the advancement and retraction driver includes a follower attached to the pump-driving shaft and a guide member capable of adjusting inclination angle thereof relative to a reference surface orthogonal with the axial direction of the pump-driving shaft, the guide member guiding the follower moving in accordance with the rotation of the pump-driving shaft to advance and retract the pump-driving shaft.

2. The pump dispenser according to claim 1, wherein an end of the guide member is supported by a fixed shaft fixed to a case in a pivotable manner, the pump dispenser further comprising a discharge controller capable of adjusting the inclination angle relative to the reference surface of the guide member by moving the other end of the guide member in the axial direction of the pump-driving shaft.

3. The pump dispenser according to claim 2, wherein the discharge controller is capable of moving the other end of the guide member from a position on a reference surface at the same level with the fixed shaft to move away from the pump block relative to the fixed shaft.

4. The pump dispenser according to claim 2, wherein the discharge controller includes a micrometer and the other end of the guide member is moved interlocking with the advancement and retraction of a spindle of the micrometer.

* * * * *